United States Patent

Gerst, III et al.

[19]

[11] Patent Number: 5,914,476
[45] Date of Patent: Jun. 22, 1999

[54] OPTICAL READER CONFIGURED TO ACCURATELY AND RAPIDLY READ MULTIPLE SYMBOLS

[75] Inventors: Carl W. Gerst, III, Syracuse; Andrew Longacre, Jr., Skaneateles, both of N.Y.

[73] Assignee: Welch Allyn, Inc., Skaneateles Falls, N.Y.

[21] Appl. No.: 08/963,747

[22] Filed: Nov. 4, 1997

[51] Int. Cl.[6] .................................................. G06K 7/10
[52] U.S. Cl. ......................... 235/462.07; 235/462.01; 235/462.12; 235/462.25
[58] Field of Search ................. 235/462.01, 462.07, 235/462.08, 462.12, 462.25

[56] References Cited

U.S. PATENT DOCUMENTS

| | | | |
|---|---|---|---|
| 5,039,847 | 8/1991 | Morii et al. | 235/379 |
| 5,513,017 | 4/1996 | Knodt et al. | 358/471 |
| 5,550,366 | 8/1996 | Roustaei | 235/462.34 |
| 5,557,091 | 9/1996 | Krummel | 235/462.08 |
| 5,739,518 | 4/1998 | Wang | 235/462.09 |
| 5,773,806 | 6/1998 | Longacre, Jr. | 235/462.1 |
| 5,825,006 | 10/1998 | Longacre, Jr. et al. | 235/472 |

*Primary Examiner*—Anita Pellman Gross
*Assistant Examiner*—Diane I. Lee
*Attorney, Agent, or Firm*—Wall Marjama Bilinski & Burr

[57] ABSTRACT

In the present invention, an optical reader is made to commence image capture and decoding when a trigger of the reader is pulled, and to continuously attempt to decode symbols in captured image data until the time the trigger is released. Despite continuously attempting to decode symbols during the entire period in which a trigger is actuated, a reader according to the invention is made so as not to output data messages pertaining to the same symbol more than once during one trigger-actuation period. To this end, a reader operating according to the invention maintains a list of identification strings identifying all symbols which have been successfully decoded since the time the trigger was pulled. When symbols in image data are decoded, identification strings for those symbols are determined and then compared to identification strings previously written to the list. If an identification string for a successfully decoded symbol is not on the list, the reader outputs a data message for the symbol, and adds the identification string to the identification string list.

26 Claims, 5 Drawing Sheets

| SHIP FROM: GOOD SUPPLIER | SHIP TO: | |
|---|---|---|
| (Q) QUANTITY:<br>500<br>‖‖‖‖‖‖‖‖‖ | | Weight: 263.2 KG |
| (P) PART # CUST:<br>ABCD<br>‖‖‖‖‖‖‖‖‖ | | ΩΩ |
| (K) P.O.:<br>PO505<br>‖‖‖‖‖‖‖‖‖ | | Volume: 1.65 CR |
| (1J) LICENSE PLATE<br>EABCXX<br>‖‖‖‖‖‖‖‖‖ | | |

OPTICAL READER CONFIGURED TO ACCURATELY AND RAPIDLY READ MULTIPLE SYMBOLS

BACKGROUND OF THE INVENTION

1. Field of the Invention

The invention relates to optical readers in general, and in particular to a method for operating a portable trigger-actuated optical reader in a way that enables the reader to accurately and rapidly read symbols in scenes having multiple symbols.

2. Background of the Prior Art

Currently available portable trigger-activated optical readers are typically configured to operate in "repeat until done" mode. A reader configured in this operating mode will continuously capture frames of image data in response to a trigger being pulled, and will attempt to decode any symbol which may be represented in that image data. The reader will continuously scan and attempt to decode image data until a first symbol is successfully decoded. When a first symbol is successfully decoded, the reader automatically stops capturing image data and stops attempting to decode image data. The trigger of the reader must be pulled again if a user wishes to decode a second symbol.

The repeat-until-done operating protocol is highly useful in the case where the reader is used to decode an isolated symbol that is formed in a region a substantial distance away from other symbols. The operating method prevents unnecessary re-decoding of the same symbol, and redundant outputting of identical data messages during the time a trigger is pulled.

However, in recent years, it has become increasingly common to form multiple bar code symbol in close proximity to one another on packages and other objects. A user operating a reader configured in a repeat-until-done mode will frequently encounter difficulty in attempting to decode symbols in scenes having more than one symbol and in particular scenes having multiple symbols formed in close proximity to one another. In order to capture and decode two symbols using a reader configured in a repeat-until-done mode, it is necessary to pull the trigger to decode a first symbol, release the trigger, and then pull the trigger again in order to attempt to decode the second symbol. In addition to being cumbersome and time consuming, there is no assurance that the method will be effective in decoding and outputting message data from both symbols, particularly if the two symbols are closely spaced. During the period in which the trigger is pulled for the second time, the reader may decode a first symbol that was decoded when the trigger was pulled for the first time, without decoding the second symbol.

There is a need for a method for operating an optical reader so that the reader accurately and rapidly decodes symbols in scenes having multiple symbols, and particularly symbols formed in close spaced relation to one another.

SUMMARY OF THE INVENTION

According to its major aspects and broadly stated, the present invention is a method for operating a portable trigger-actuated optical reader in a way that enables the reader to rapidly and accurately read symbols in scenes having multiple symbols.

In the present invention, an optical reader is made to commence image capture and decoding when a trigger of the reader is pulled, and to continuously attempt to decode symbols in captured image data until the time the trigger is released. Despite continuously attempting to decode symbols during the entire period in which a trigger is actuated, a reader according to the invention is made so as not to output data messages pertaining to the same symbol more than once during one trigger-actuation period.

To this end, a reader operating according to the invention maintains a list of identification strings identifying all symbols which have been successfully decoded since the time the trigger was pulled. When symbols in image data are decoded, identification strings for those symbols are determined and then compared to identification strings previously written to the list. If an identification string for a successfully decoded symbol is not on the list, the reader typically outputs a data message for the symbol, issues an indicator indicating that the message has been output, and adds the identification string to the identification string list. If an identification string for a successfully decoded symbol has been previously written to the list (indicating that a data message for the symbol has been previously output during the present trigger-actuation period), then the reader continues to attempt to decode symbols in captured image data and does not redundantly output the data message for the symbol.

These and other details, advantages and benefits of the present invention will become apparent from the detailed description of the preferred embodiment hereinbelow.

BRIEF DESCRIPTION OF THE DRAWINGS

The preferred embodiment of the invention will now be described, by way of example only, with reference to the accompanyiny Figures wherein like elements bear like reference numerals and wherein.

DETAILED DESCRIPTION OF THE PREFERRED EMBODIMENT

Figure 1:
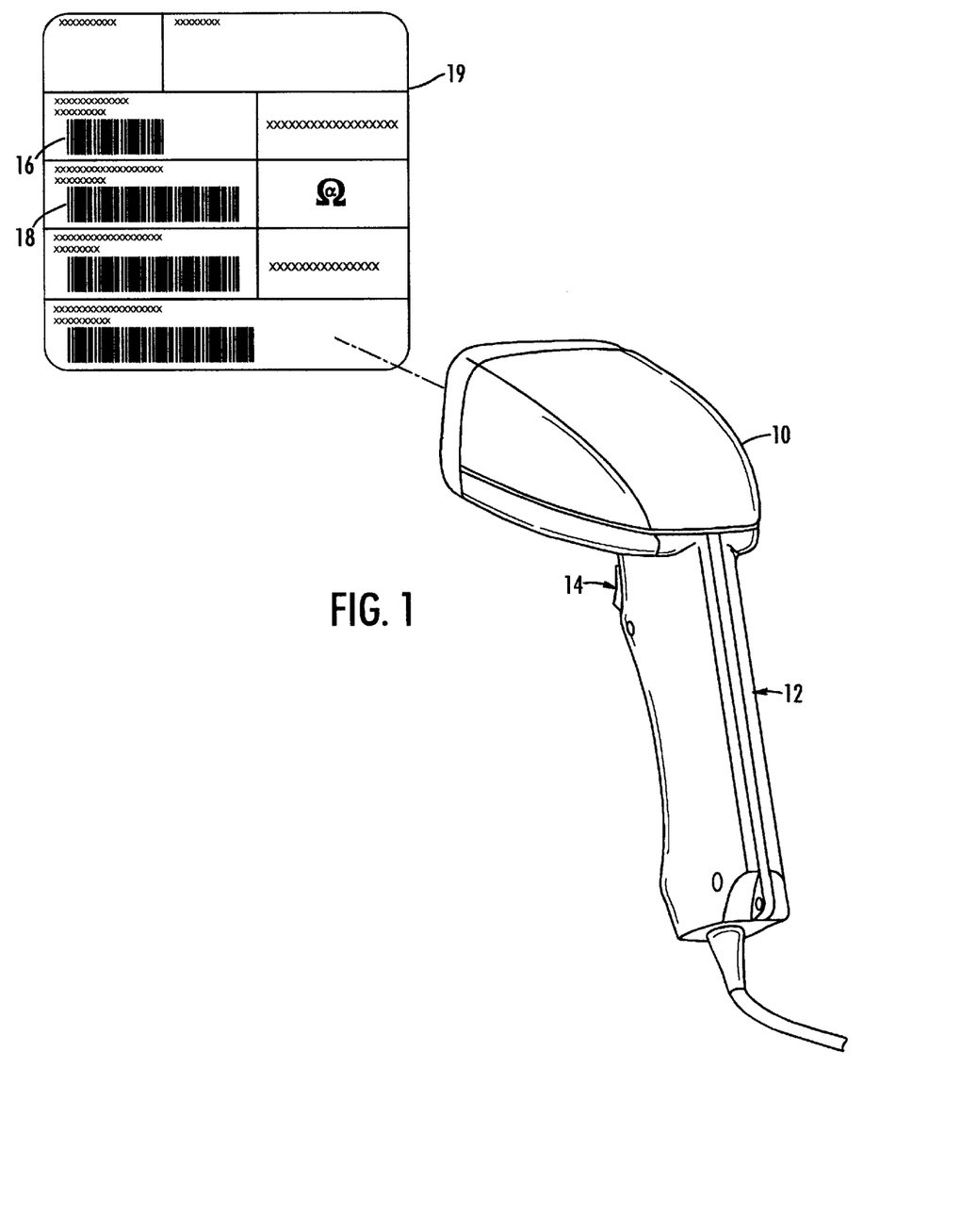
FIG. 1 is a perspective view of an optical reader of a type in which the present invention may be incorporated, and a packaging label having a plurality of bar code symbols formed thereon.

A portable optical reader of the type in which the present invention may be incorporated is shown in FIG. 1. Portable optical reader 10 includes a housing which normally includes handle 12 and a trigger 14 which when pulled caused reader to commence image capture and decoding operations.

The reader operating method of the invention is especially useful in the case where the reader is employed to decode multiple closely spaced symbols e.g. 16, 18. Packaging labels such as 19 that include more than one bar code symbol are being made increasing numbers.

Figure 2:
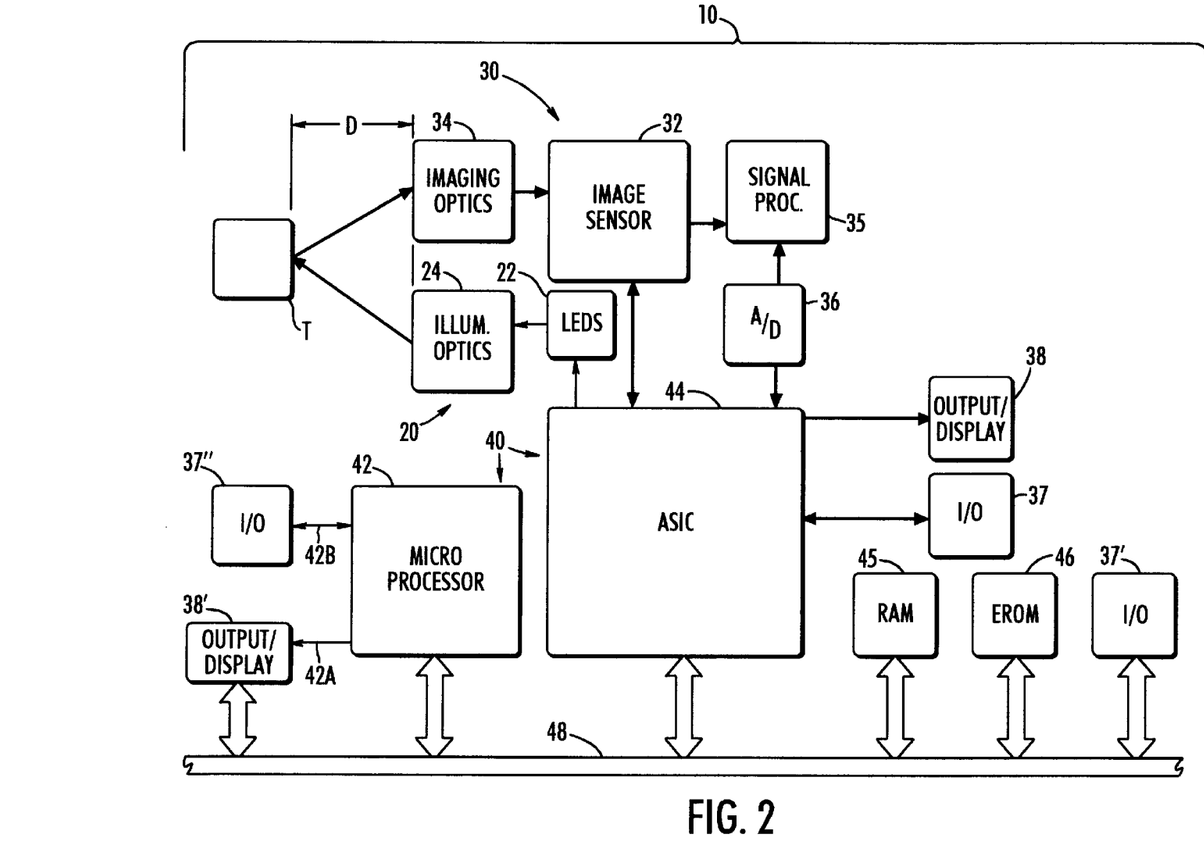
FIG. 2 is a block diagram of an optical reader of a type in which the present invention may be incorporated.

A block diagram of an optical reader of a type which may be implemented in the system of the invention is shown in FIG. 2. Optical reader 10 includes an illumination assembly 20 for illuminating a target object T, such as a 1D or 2D bar code symbol, and an imaging assembly 30 for receiving an image of object T and generating an electrical output signal indicative of the data optically encoded therein. Illumination assembly 20 may, for example, include an illumination source assembly 22, such as one or more LEDs, together with an illuminating optics assembly 24, such as one or more reflectors, for directing light from light source 22 in the direction of target object T. Illumination assembly 20 may be eliminated if ambient light levels are certain to be high enough to allow high quality images of object T to be taken. Imaging assembly 30 may include an image sensor 32, such as a 2D CCD or CMOS solid state image sensor, together with an imaging optics assembly 34 for receiving and focusing an image of object T onto image sensor 32. The array-based imaging assembly shown in FIG. 2 may be replaced by a laser scanning based imaging assembly comprising a laser source, a scanning mechanism, emit and receive optics, a photodetector and accompanying signal processing circuitry.

Optical reader 10 of FIG. 2 also includes programmable controller 40 which preferably comprises an integrated circuit microprocessor 42 and an application specific integrated circuit or ASIC 44. Processor 42 and ASIC 44 are both programmable control devices which are able to receive, output and process data in accordance with a stored program stored in either or both of a read/write random access memory or RAM 45 and an erasable read only memory or EROM 46. Processor 42 and ASIC 44 are also both connected to a common bus 48 through which program data and working data, including address data, may be received and transmitted in either direction to any circuitry that is also connected thereto. Processor 42 and ASIC 44 differ from one another, however, in how they are made and how they are used.

More particularly, processor 42 is preferably a general purpose, off-the-shelf VLSI integrated circuit microprocessor which has overall control of the circuitry of FIG. 2, but which devotes most of its time to decoding image data stored in RAM 45 in accordance with program data stored in EROM 46. Processor 44, on the other hand, is preferably a special purpose VLSI integrated circuit, such as a programmable logic or gate array, which is programmed to devote its time to functions other than decoding image data, and thereby relieve processor 42 from the burden of performing these functions.

The actual division of labor between processors 42 and 44 will naturally depend on the type of off-the-shelf microprocessors that are available, the type of image sensor which is used, the rate at which image data is output by imaging assembly 30, etc. There is nothing in principle, however, that requires that any particular division of labor be made between processors 42 and 44, or even that such a division be made at all. This is because special purpose processor 44 may be eliminated entirely if general purpose processor 42 is fast enough and powerful enough to perform all of the functions contemplated by the present invention. It will, therefore, be understood that neither the number of processors used, nor the division of labor therebetween, is of any fundamental significance for purposes of the present invention.

With processor architectures of the type shown in FIG. 2, a typical division of labor between processors 42 and 44 will be as follows. Processor 42 is preferably devoted primarily to the tasks of decoding image data, once such data has been stored in RAM 45, handling the menuing options and reprogramming functions, and providing overall system level coordination. Processor 44 is preferably devoted primarily to controlling the image acquisition process, the A/D conversion process and the storage of image data, including the ability to access memories 45 and 46 via a DMA channel. Processor 44 may also perform many timing and communication operations. Processor 44 may, for example, control the illumination of LEDs 22, the timing of image sensor 32 and an analog-to-digital (A/D) converter 36, the transmission and reception of data to and from a processor external to reader 10, through an RS-232 (or other) compatible I/O device 37 and the outputting of user perceptible data via an output device 38, such as a beeper, a good read LED and/or a liquid crystal display. Control of output, display and I/O functions may also be shared between processors 42 and 44, as suggested by bus driver I/O and output/display devices 37' and 38' or may be duplicated, as suggested by microprocessor serial I/O ports 42A and 42B and I/O and display devices 37" and 38'. As explained earlier, the specifics of this division of labor is of no significance to the present invention.

Figure 3:
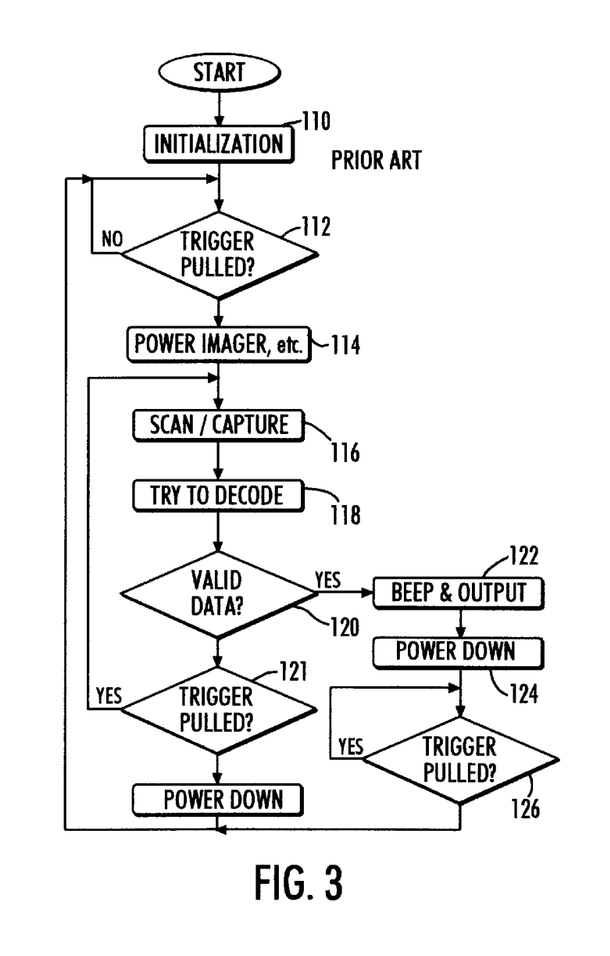
FIG. 3 is a flow diagram illustrating an embodiment of the repeat until done reader mode of operation of the type that is executed by existing optical readers.

To better understand the present invention, an operating method for operating an existing optical reader is first described. A flow diagram illustrating operation of an optical reader configured to operate in a prior art repeat-until-done operating mode is shown in FIG. 3.

After certain preliminary steps are executed at block 110 involving initialization of reader hardware and defining memory address locations controller 40 proceeds to block 112 and determines whether trigger 14 has been pulled. If the trigger has been pulled, the controller proceeds to block 114 to power up imaging assembly 30 and to carry out certain routine preliminary step such as applying power to reader video circuits and initializing scanning parameters. Subsequently, controller 40 commences image capturing at block 116.

At block 116 controller 40 captures a first frame of image data, and at block 118 processes and attempts to decode any symbol which may be represented in the image data. In a repeat until done operating mode, reader 10 will continuously capture and attempt to decode symbols represented in the image data until either a first symbol is successfully decoded, or until the trigger is released (block 121). A determination as to whether a symbol has been decoded (whether valid data was determined for the symbol) is made at block 120. If a symbol is successfully decoded, controller 40 immediately stops capturing image data and attempting to decode symbols, and instead exits to block 122. At block 122, controller 40 causes the reader to emit a tone or another user-understandable indicator which indicates to a user that valid data has been determined for a symbol, and outputs the data message from the symbol normally to, for example, a host processor, a memory space, or a display device. Controller 40 then powers down imaging 30 assembly at block 124 before determining at block 126 whether trigger 4 is still pulled. When the trigger is released controller 40 proceeds to block 112 and waits for the trigger to be pulled again.

Figure 4:
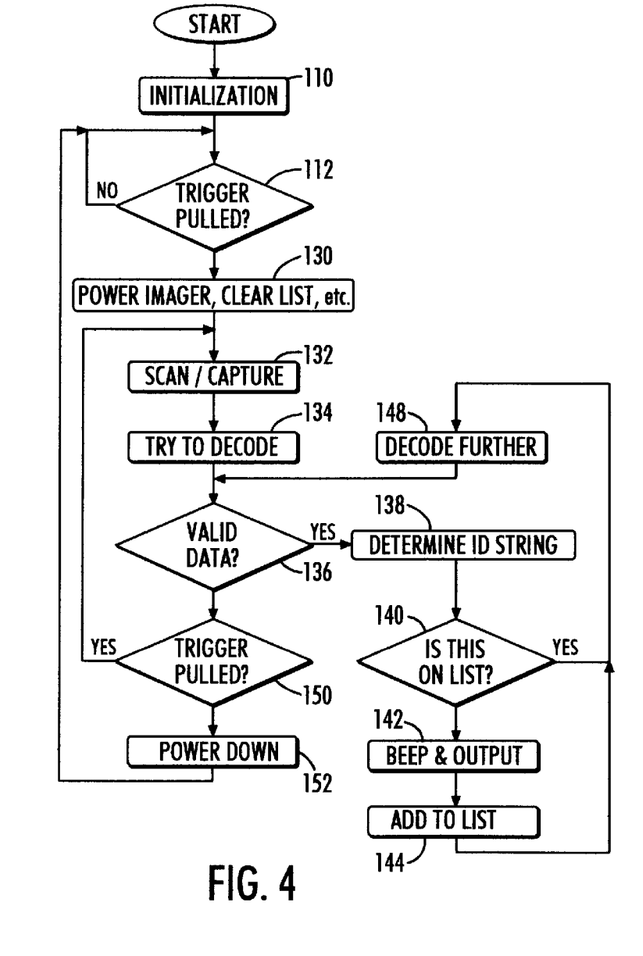
FIG. 4 is a flow diagram of an embodiment of the reader operating method of the invention.

A flow diagram of a reader configured to operate in accordance with the operating method of the present invention is shown in FIG. 4. In the operating method of the invention, the reader will not cease capturing image data and attempting to decode symbols after a first symbol is successfully decoded. Instead, the reader will continue to attempt to decode symbols from captured image data, and possibly capture new image data after a trigger is pulled, for as long as the trigger is pulled.

After determining that the trigger has been pulled at block 112 controller 40 proceeds to block 130. In addition to powering up the imaging assembly at block 130 and executing certain other routine preliminary steps discussed with reference to block 114, controller 40 clears a list of symbol identification strings for indicating the identification of successfully decoded symbols.

In the present invention, each new symbol that is successfully decoded is identified by an identification string which indicates the identity of the symbol. An identification string comprises at least one identifier identifying the symbol. Examples of useful identifiers for identifying a symbol are "CodeID," a character identifying the symbology type of the symbol; "MessageLength," the number of characters in the decoded message decoded from the symbol; "MessageSum," a sum of all character values in a decoded message; and "SumOfSums," a positionally weighted sum of all character values of a decoded message. An identifier of an identification string can also be provided by the decoded message, or a portion of the decoded message. However it is normally preferred to provide an identification string having non-message identifiers (e.g CodeID, MessageLength, MessageSum, SumofSums) because these types of identifiers generally require less memory space than an identifier comprising a complete or partial decoded message.

After clearing the identification string list at block 130, controller 40 proceeds to block 132, and captures a frame of image data. Controller 40 may capture either a 1D or 2D image at block 132. At block 134 controller 40 attempts to decode any symbol which may be represented in the image data, and at block 136, controller 40 determines if a symbol has been successfully decoded. A symbol is successfully decoded if a valid data message is determined for the symbol. If a symbol is successfully decoded then the controller proceeds to block 138 to determine an identification string for the successfully decoded symbol, then at block 140 compares the identification string for the most recently decoded symbol to identification strings previously written to the identification string list. If the identification string determined for the most recently decoded symbol is not on the identification string list, then the controller at block 142 outputs the data message for the most recently decoded symbol, and causes the reader to emit a tone or another user-understandable indicator to indicate to a user that the data message has been output. Controller at block 144 then adds the identification string identifying the most recently decoded symbol to the identification string list.

When the identification string identifying the most recently decoded symbol has been previously written to the list of identification strings then the condition is indicated that the most recently decoded symbol has previously been decoded and the data message for the most recently decoded symbol has previously been output. Accordingly, when controller 40 at block 140 determines that the identification string identifying the most recently decoded symbol is on the list of identification strings, then controller 40 proceeds to block 148 and attempts to decode a next symbol represented in the image data captured at block 132. A reader according to the invention will normally be configured to decode as many symbols as is possible to decode from a single frame of image data captured at block 132. When controller 40 attempts to decode a next symbol in a frame of image data from which controller 40 has previously decoded a symbol, the method for locating symbol image data in the frame should be varied from methods used previously to locate symbol image data in that frame so that a symbol other than one previously decoded from that frame will be located and decoded. For example, at least a portion of image data in locations of captured frames representing successfully decoded symbols may be deleted, or otherwise altered at block 148 (when the reader attempts to decode additional symbols from a previously captured frame of image data) so that an attempt to decode symbols represented in the image data does not result in the same symbol being decoded for a second time.

When at block 136, controller 40 determines that the present frame of image data does not include, or includes no further successfully decodable symbols, then controller 40 proceeds to block 132 to capture a next frame of image data in the case that the trigger is still pulled. If controller 40 determines at block 150 that the trigger has been released then the controller proceeds to block 152 to power down imaging assembly, and waits for the trigger to be pulled again at block 112.

In one variation of the invention, the list of identification strings which is cleared at block 130 and added to at block 144 is replaced with a predetermined list of identification strings. Each identification string on such a predetermined list may identify a feature, e.g. "CodeID" of one symbol that is known to be included in a known multiple symbol scene including symbols that are to be decoded. When each new symbol is decoded, an identification string for the symbol is determined and compared to the identification stings included on the predetermined list of identification strings. If the identification string for the most recently decoded symbol is on the list, then the data message for the symbol is outputted and the identification string on the list is designated so that, if a symbol is again decoded having that same identification string, then the controller is prevented from outputting a data message for that symbol a second time. The reader in this embodiment may be made to automatically cease image capturing and decoding before a trigger is released in the case that the controller successfully decodes at least one symbol corresponding to each identification string on the list.

Figure 5A:
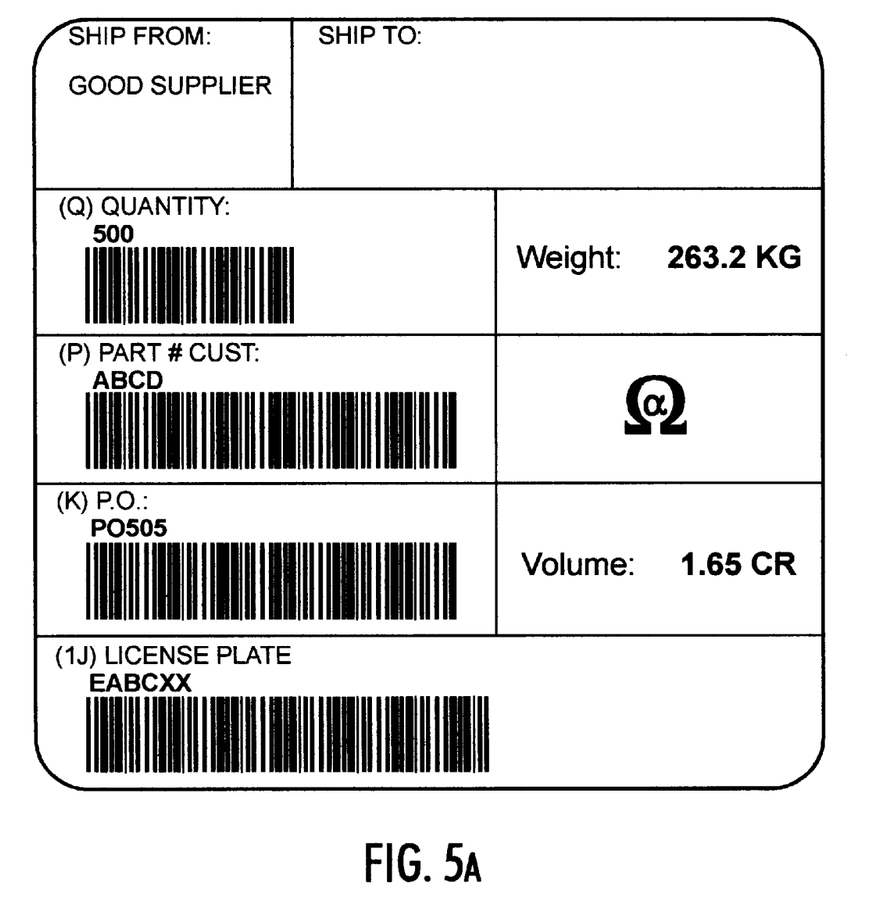
FIGS. 5A and 5B show examples of packaging labels having multiple closely spaced labels.
Figure 5B:
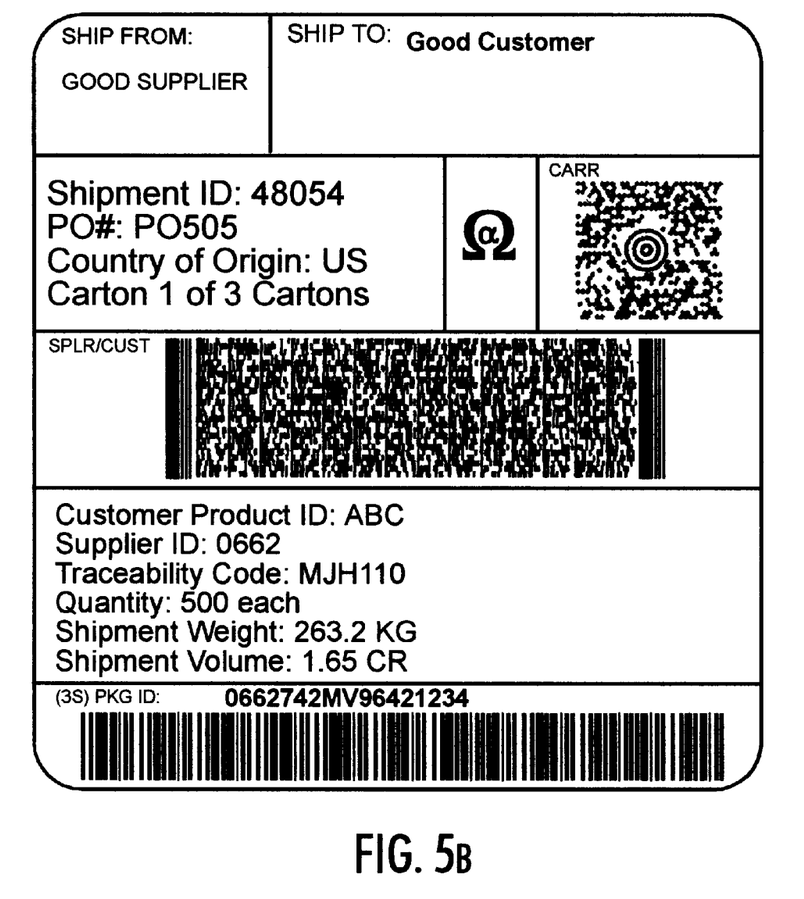

Examples of multiple symbol packaging labels of the type which are becoming increasingly common are shown in FIGS. 5A and 5B. FIG. 5A shows a packaging label containing multiple 1D bar code symbols, while FIG. 5B shows a packaging label comprising both 1D and 2D bar code symbols. It will be recognized that an optical reader configured according to the invention will read all of the symbols on a multiple symbol packaging label or in other scenes comprising multiple symbols which may be relatively closely space much more quickly, accurately and easily than a reader configured in a repeat-until-done operating mode.

In a typical application of the present invention, a user presented with a scene having multiple symbols such as that shown in FIG. 5B will make a mental note of the number of symbols that must be captured (3), then pull the trigger and begin scanning the reader over the scene in the regions of the symbols. The user will then hear first, second and third beeps as data messages from each symbol are output. When the user hears a third beep, the user is assured from the requirements of the operating method described that all three symbols have been successfully decoded, that data messages pertaining to all three symbols have been output, and that data messages have not been redundantly output. After hearing the third beep, the user may release the trigger.

A user using a reader configured in a repeat-until-done mode faces a much more difficult task in decoding all three symbols in a scene such as one shown in FIG. 5B. First, the task of decoding all three symbols using a reader configured in a repeat-until-done mode is cumbersome. For example, in order to attempt to decode a second symbol, the user must first pull the trigger in order to decode and output a data message from a first symbol, wait for a beep, and then release and pull the trigger again. Furthermore, there is no assurance of accuracy. When attempting to decode the second symbol there is no assurance that the second symbol will not be missed and that instead the first symbol will be decoded and output a second time. In attempting to decode the three symbols of a scene such as that shown in FIG. 5B a user may pull and release the trigger three times, hear three beeps, and in actuality may have decoded and output a data message for the same symbol three times. The problem of decoding the wrong symbol increases when there are particularly closely spaced symbols in a scene.

In the case where only linear bar code symbols are to be decoded in a multiple symbol scene (such as that shown in FIG. 5A) the speed with a 2D reader can decode and output data messages for all symbols on the scene can be further increased by disabling 2D symbology decoding algorithms otherwise executed when the controller attempts to decode for symbols represented in captured image data at blocks 134 or 148. Methods for carrying out such disabling are discussed in copending application Ser. No. 08/839,020 entitled "Optical Reader System Comprising Local Host Processor and Optical Reader" filed on Apr. 23, 1997 assigned to assignee of the present invention and incorporated by reference herein.

While this invention has been described in detail with reference to a preferred embodiment, it should be appreciated that the present invention is not limited to that precise embodiment. Rather, in view of the present disclosure which describes the best mode for practicing the invention, many modifications and variations would present themselves to those skilled in the art without departing from the scope and spirit of this invention, as defined in the following claims.

What is claimed is:

1. A method for operating a portable trigger-actuated optical reader, said method comprising the steps of:
    waiting for said trigger to be pulled; and
    while said trigger is pulled
        capturing image data;
        attempting to decode symbols represented in captured image data;
        determining a present identification string for each symbol successfully decoded;
        comparing each present identification string to identification strings previously written to an identification string list; and
        when a present identification string for a most recently decoded symbol is not on said list
            outputting a decoded message for said most recently decoded symbol; and
    writing said present identification string to said identification string list.

2. The method of claim 1, wherein said method further includes the step, when a present identification string for a most recently decoded symbol is not on said list, of emitting a user understandable indicator to a user indicating that said reader has or will output a decoded message for a most recently decoded symbol.

3. The method of claim 1, wherein said method further includes the step of clearing said identification string list when said trigger is pulled.

4. The method of claim 1, wherein said attempting to decode step includes the step of trying to decode as many symbols as possible from a single frame of image data.

5. The method of claim 1, wherein said capturing step includes the step of capturing a next frame of image data when all decodable symbols of a previous frame of image data have been decoded.

6. The method of claim 1, further including the step, when a symbol is successfully decoded, of altering at least some image data in a location of a present frame of image data corresponding to said most recently decoded symbol so that said reader does not decode the same symbol from a single frame of image data more than once.

7. The method of claim 1, further including the step of ceasing capturing image data, and ceasing attempting to decode captured image data when said trigger is released.

8. The method of claim 1, wherein said identification string determining step includes the step of reading at least a portion of a decoded message for said most recently decoded symbol.

9. The method of claim 1, wherein said identification string determining step includes the step of reading a CodeID for said most recently decoded symbol.

10. The method of claim 1, wherein said identification string determining step includes the step of calculating a MessageLength value for said most recently decoded symbol.

11. The method of claim 1, wherein said identification string determining step includes the step of calculating a MessageSum value for said most recently decoded symbol.

12. The method of claim 1, wherein said identification string determining step includes the step of calculating a SumofSums value for said most recently decoded symbol.

13. The method of claim 1, further comprising the step of configuring said reader to read 1D symbols only.

14. A method for operating a portable trigger-actuated optical reader, said method comprising the steps of:
    establishing a predetermined list of identification strings identifying symbols that are to
        be decoded in a scene;
    waiting for said trigger to be pulled;
    while said trigger is pulled
        capturing image data;
        attempting to decode symbols represented in captured image data;
        determining a present identification string for each symbol successfully decoded;
        comparing each present identification string to identification strings of said identification string list; and
        when a present identification string for a most recently decoded symbol is on said list and not designated as being previously determined
            outputting a decoded message for said most recently decoded symbol; and
    designating an identification string on said predetermined list corresponding to said present identification string as being previously determined so that said reader is prevented from outputting a data message for the same decoded symbol more than once.

15. The method of claim 14, wherein said method further includes the step, when a present identification string for a most recently decoded symbol is on said list and not designated as being previously determined, of emitting a user understandable indicator to a user indicating that said reader has or will output a decoded message for a most recently decoded symbol.

16. The method of claim 14, wherein said attempting to decode step includes the step of trying to decode as many symbols as possible from a single frame of image data.

17. The method of claim 14, wherein said capturing step includes the step of capturing a next frame of image data when all decodable symbols of a previous frame of image data have been decoded.

18. The method of claim 14, further including the step, when a present identification string for a most recently decoded symbol is not on said list, of altering at least some image data in a location of a present frame of image data corresponding to said most recently decoded symbol so that said reader does not decode the same symbol from a single frame of image data more than once.

19. The method of claim 14, further including the step of ceasing capturing image data, and ceasing attempting to decode captured image data when said trigger is released.

20. The method of claim 14, further comprising the step of ceasing capturing image data and ceasing attempting to decode symbols in image data when said each identification string on said predetermined list is designated as being previously.

21. The method of claim 14, wherein said identification string determining step includes the step of reading at least a portion of a decoded message for said most recently decoded symbol.

22. The method of claim 14, wherein said identification string determining step includes the step of reading a CodeID for said most recently decoded symbol.

23. The method of claim 14, wherein said identification string determining step includes the step of calculating a MessageLength value for said most recently decoded symbol.

24. The method of claim 14, wherein said identification string determining step includes the step of calculating a MessageSum value for said most recently decoded symbol.

25. The method of claim 14, wherein said identification string determining step includes the step of calculating a SumOfSums value for said most recently decoded symbol.

26. The method of claim 14, further comprising the setup configuring said reader to read 1D symbols only.

* * * * *